United States Patent
Lake et al.

(10) Patent No.: US 7,657,079 B2
(45) Date of Patent: Feb. 2, 2010

(54) SINGLE CONSTRAINT AT A TIME (SCAAT) TRACKING OF A VIRTUAL REALITY (VR) DISPLAY

(75) Inventors: Adam T. Lake, Portland, OR (US); Carl S. Marshall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 686 days.

(21) Appl. No.: 10/185,577

(22) Filed: Jun. 28, 2002

(65) Prior Publication Data

US 2004/0001647 A1    Jan. 1, 2004

(51) Int. Cl.
*G06K 9/00* (2006.01)
*G06K 9/20* (2006.01)
*G06K 9/32* (2006.01)
*G06K 9/36* (2006.01)

(52) U.S. Cl. ............... 382/154; 382/103; 382/285; 382/294

(58) Field of Classification Search ........... 382/154, 382/103, 285, 294
See application file for complete search history.

(56) References Cited

U.S. PATENT DOCUMENTS

| | | | | | |
|---|---|---|---|---|---|
| 5,870,136 | A | * | 2/1999 | Fuchs et al. | 348/42 |
| 6,064,749 | A | * | 5/2000 | Hirota et al. | 382/103 |
| D449,848 | S | * | 10/2001 | Lewis et al. | D16/242 |
| 6,657,654 | B2 | * | 12/2003 | Narayanaswami | 348/14.04 |
| D488,154 | S | * | 4/2004 | Lovelady et al. | D14/345 |
| 6,999,802 | B2 | * | 2/2006 | Kim | 455/575.1 |
| D520,976 | S | * | 5/2006 | LaDelfa | D14/138 |
| 7,043,284 | B2 | * | 5/2006 | Tornaghi | 455/575.1 |
| D523,239 | S | * | 6/2006 | Goradesky et al. | D3/218 |

* cited by examiner

*Primary Examiner*—Wesley Tucker
(74) *Attorney, Agent, or Firm*—Blakely, Sokoloff, Taylor & Zafman LLP

(57) ABSTRACT

A system to capture an image and determine a position of an object utilizes a camera. A first processing module recognizes a set of predetermined landmarks, including a first landmark and remainder landmarks, in the image. A second processing module determines an actual location of the first landmark in the image, and applies at least one filtering scheme to estimate positions of the remainder landmarks in the image. A third processing module determines a pose of the object based on the actual location of the first landmark and the estimated positions of the remainder landmarks.

32 Claims, 11 Drawing Sheets

SINGLE CONSTRAINT AT A TIME (SCAAT) TRACKING OF A VIRTUAL REALITY (VR) DISPLAY

BACKGROUND

1. Technical Field

This invention relates to the field of Virtual Reality (VR) rendering systems, and more specifically, to a system, method, and apparatus for utilizing a hand-held Personal Digital Assistant (PDA) to display a virtual environment based on a pose of a user in a real environment, where the pose is determined by locating a single constraint in an image of the user moving in the real environment.

2. Description of Related Arts

There are several virtual reality video systems currently being utilized in the art. "Virtual reality" (VR) is an artificial reality that projects a user into a 3-D space generated by a computing device. Most virtual reality systems employ specialized display systems such as "VR goggles", "VR helmets" and "heads-up displays" to achieve a greater sense of immersion. Such display systems are often implemented as a helmet to continuously place a high-resolution display directly in front of a user's eyes. The system also has a host processing system that is capable of delivering high performance 3D graphics at interactive frame rates.

The helmet is also equipped with a location and orientation tracking device. Such devices can produce a six dimensional description of the helmet wearer's current 3-space location and relative orientation. The six dimensions are recorded as position (x, y, z) and orientation (azimuth, elevation, roll). Such systems can transmit this information on order of tens or hundreds of times a second. This information is sent to the host processor and used to dynamically update the 3D images being displayed in the helmet.

The result is that when the user moves his/her head in the real world, the system displays an image that simulates as though the user moved his/her head in the virtual world. Such a system can easily give the user the sensation of being able to walk and look around the virtual world. The interaction in the virtual world is natural because it is driven by natural user moves in the physical world.

One technology for implementing such tracking systems employs a three-dimensional electromagnetic field emitter mounted in the ceiling. The helmet has a receiver that is able to read the magnetic field and determine the receiver's location and orientation. The receiver then sends this data to the host computer via a serial cable.

A virtual reality system requiring a user to wear a helmet is deficient, however. The helmets are often large and heavy, resulting in the user experiencing neck pains or having to periodically remove the helmet and rest. Also, virtual reality simulator sickness is a common problem, and the most effective solutions entail giving the user a visual cue to the real world (either an overlaid small video window of the real world or synthetic objects that remain anchored with respect to the real world). However, the displays often strain eyes as they require long periods of near distance focus. Furthermore, many users are not excited about the idea of spending long hours of time in a powerful electromagnetic field. Also, the helmets are socially unacceptable in some contexts. In other words, users wearing big, bulky helmets often makes the user look strange. The use of the helmets also dramatically restricts where the applications can be used. Usually the system requires a dedicated room to house the system and the electromagnet field generators. Often the display and tracking system requires having a fixed length cable to connect it to the host system that performs the display rendering and signal processing. Accordingly, such systems are inherently non-portable.

There are other virtual reality systems in the art that determine the pose of a user by locating lit Light Emitting Diodes (LEDs) in the field of vision of a camera coupled to a device held by the user. Such systems must first locate all LEDs in the field of vision, and then determine the position of the user based on these locations. Such a system is faulty, however, because LEDs must be placed in a wall or ceiling, and much processing power is utilized to locate and determine the precise location of each LED viewable by the camera. Because so much processing power must be utilized to determine the exact locations of the LEDs, a rendered 3D environment can "lag" behind the movement of the user, resulting in a "swimming effect." In other words, the 3D environment cannot keep up with the user's movements, and is slow in changing the 3D environment according to the user's movements. Therefore, the 3D environment that the user should see is delayed. This lag effect often results in the user becoming sick or getting a headache. Therefore, it is inefficient to have to determine the exact location of each LED prior to determining the pose of the user.

Accordingly, current virtual reality systems are deficient because most require the user to wear a helmet, some require the user to stand near an electromagnetic field to determine the user's orientation, they have location restrictions, they are socially unacceptable, physically uncomfortable, and must determine the exact location of multiple objects prior to rendering an update to the 3-D environment shown to the user.

DETAILED DESCRIPTION

An embodiment of the invention utilizes a camera to capture an image, and includes an image processing device to recognize predetermined "landmarks" in the captured image. The "landmarks" may be dots of a predetermined color (e.g., neon yellow) that are drawn on a wall, for example. Alternatively, the landmarks may be edges of an object in the image, or the eyes of a user, if the camera is pointed at the user, for example. There may be multiple landmarks in a captured image. The image may be a digital image sampled from a video camera. An image processing device may then determine the exact location of a single landmark in the image. The image processing system may apply various filtering methods to estimate the location of all other known landmarks in the image. Once the positions of all, or a predetermined number of, landmarks in the image are known or estimated, the system may utilize the position information to determine the pose of the camera if the camera is directed at a wall or ceiling, for example. Alternatively, if the camera is directed toward the user's face, the system may determine the pose of the user's face. Once the pose is known, a 3-Dimensional (3-D) rendering device may calculate a 3-D environment and display such environment on a display unit which may be coupled to the camera, for example. Other embodiments may utilize a display unit that is separate from the camera.

Figure 1:
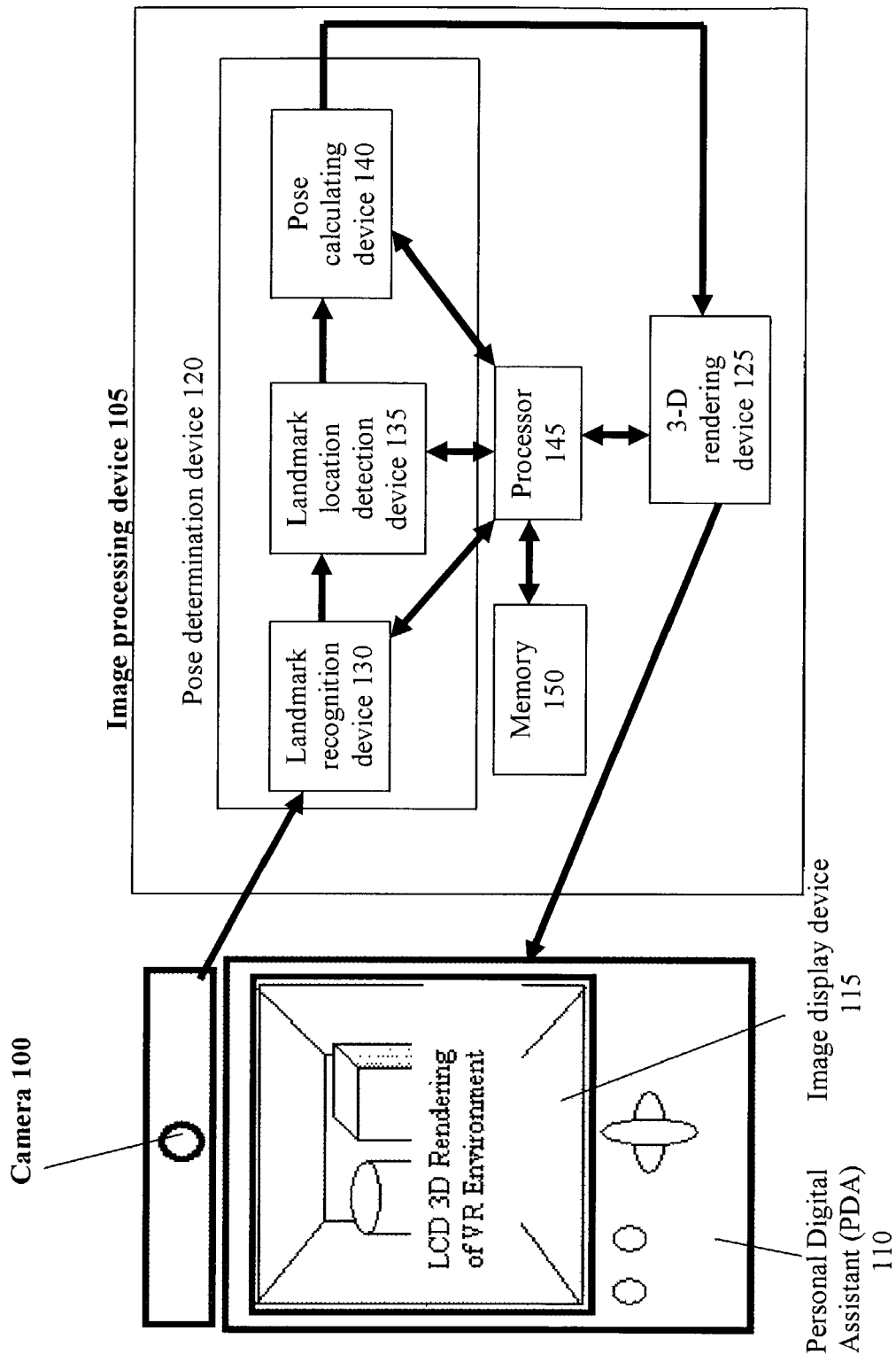
FIG. 1 illustrates a system overview of a camera, an image processing device, and a Personal Digital Assistant (PDA) having an image display device according to an embodiment of the invention.

FIG. 1 illustrates a system overview of a camera 100, an image processing device 105, and a Personal Digital Assistant (PDA) 110 having an image display device 115 according to an embodiment of the invention. The embodiment may be utilized to calculate and display a virtual reality environment for a user. The user may hold the PDA 110 in the palm of the user's hand, with the camera 100 facing up toward the ceiling of a room, or to the side of a room, for example. The camera 100 may be mounted to a top end of the PDA 110, for example. The camera 100 may be coupled to the PDA 110 via any suitable connection device as discussed below with respect to FIGS. 2A and 2B. In other embodiments, the camera 100 may be housed within the PDA 110 as discussed below with respect to FIG. 2C.

The PDA 110 may be utilized to implement a virtual reality game, for example, or as an insurance estimate-determining application, for example. If used to implement a virtual reality game, the user may utilize the PDA 110 while moving around within an environment known to a processor within the PDA 110. For example, the user may utilize the PDA 110 while walking through an empty room, for example. The empty room may have side walls, a floor, and a ceiling. The walls and the ceiling may include various "landmarks." The "landmarks" may be dots of a predetermined color (e.g., neon yellow) that are drawn on a wall, for example. Alternatively, the landmarks may be edges of objects in the image, or the eyes of a user, if the camera is pointed at the user, for example. As the user walks around the empty room, the user may hold the PDA 110 in the palm of the user's hand, so that the user can look down at an image display device 115 of the PDA 110, and the camera 100 is directed toward the ceiling. The display device 115 may be a Liquid Crystal Display (LCD) or a small Cathode Ray Tube (CRT), for example. Landmarks that are formed of special colored marks may be utilized to determine pose. However, when displaying the 3-D virtual environment, it may not be necessary to show the landmarks.

As the user moves within the room, the camera 100 may continually capture (i.e., sample) digital images which may then be processed by an image processing device 105. The sampling rate may vary based upon the processor's computational speed. The image processing device 105 may include a pose determination device 120 to determine the pose (e.g., the direction that the camera is facing) so that the correct 3-D images are displayed on the image display device 115. The pose determination device 120 may determine the pose and then output pose information to a 3-D rendering device 125, which may utilize the pose information to calculate the 3-D image to be displayed to the user. The 3-D rendering device 125 may then output its information to the PDA 110, which may display the calculated 3-D images on the image display device 115.

The pose determination device 120 may include a landmark recognition device 130 to recognize all landmarks in a captured image from the camera 100. For example, when an image is received, the landmark recognition device may determine that there are "10" landmarks in the image, for example. The landmark recognition device 130 may output data about the landmarks to the landmark location detection device 135, which may determine the precise location of a single landmark in the image. To determine the pose of the camera 100, the image processing device 120 may utilize positional data from multiple landmarks in an image to determine the orientation of the camera. In other embodiments, the camera may determine the orientation of the user. The image processing device 120 may function quickly by determining the precise positional data of one of the landmarks in the image, and may then estimate the positions of the other landmarks in the image, and then calculate the pose based on this information. Such a method of estimating the positions of all but one landmark may result in a pose being determined more quickly than would be possible if the precise locations of multiple landmarks had been determined in the image. Calculating a pose based on the use of many estimated positions of landmarks may result in a larger error than would occur if the precise locations of all, or of many of, the landmarks in the image had been determined. However, since the pose calculation may occur more quickly (because fewer computations are necessary to determine estimated locations as opposed to actual locations), a rendered 3-D image may avoid having a "swimming" pixel problem that may occur if the pose takes too long to calculate. Moreover, the effect of the error resulting from the use of estimated error may be minimized through the use of a faster processor 145 in the image processing device 105. Accordingly, even though there is a certain degree of error, the rendered 3-D images may be quickly updated, resulting in a minimization of the error, while still avoiding producing the swimming effect that is inherent when a processor cannot calculate pose quickly enough.

The landmark location detection device 135 may determine the exact location of one of the landmarks, and may then use a set of filtering methods to estimate the locations of the remaining landmarks in the image. However, it may not be necessary to estimate the locations of all landmarks in an image. For example, if there are "25" landmarks in an image, it may be sufficient to only estimate the locations of "9" of the landmarks to determine pose after the exact location of a single landmark has been determined. Accordingly, in some situations, it may not be necessary to estimate the locations of all landmarks in the image. The number of landmarks sufficient to determine a pose of the user may be system and/or application specific. For example, if the processor 145 is very fast, more landmarks may be estimated to determine the pose than would be used if a slower processor 145 were utilized.

The estimations of the positions of landmarks may be determined based on the locations of where the landmarks were (e.g., their estimate or actual positions) in a prior image. For example, if a landmark "A" is determined to have moved "2" pixels to the left in a digital image versus its previously calculated position, the landmark location detection device 135 may determine that the other landmarks also moved "2" pixels to the left. The landmark location detection device 135 may also include various filters, as discussed below with respect to FIG. 4, which may be utilized to determine whether the user is tilting to a side or moving in an angular direction. Also, if the PDA 110 is held so that the camera is facing the angle where the ceiling meets a side wall, the side wall may be displayed on the left side of the image display device 115, and the ceiling may be displayed on the right side of the image display device 115. However, if the user tilts the PDA 110 so the camera 100 faces the wall and the ceiling at a different angle, a landmark that is located on the left wall might actually move "4" pixels to the left in the image, but a landmark on the ceiling might actually move only "2" pixels to the left. Filters in the landmark location detection device 135 may be configured to handle such a situation, so that accurate estimates of locations of landmarks ma be made.

In order to provide the best estimates of the positions of landmarks, the landmark location detection device 135 may be configured to determine the location of a different landmark than was actually determined in a previous number of images. Accordingly, if the actual location of landmark "A" was determined and the location of landmark "B" was estimated in the prior image, the landmark location detection device 135 may determine the actual location of landmark "B" in the next image and estimate the location of landmark "A." Accordingly, such calculations minimize the use of "stale," or old, actual position data of landmarks. This is the case because it is likely that the more times a particular landmark's position is estimated, the amount of error between its estimated position and its actual position increases.

After the locations of appropriate landmarks are determined, such information may be sent to pose calculating device 140. The pose calculating device 140 may have a function of determining the pose of the PDA 110 (or the camera 100), so that an accurate 3-D environment may be created. After the pose has been determined, pose information may be sent to 3-D rendering device 125, which may calculate a new, or "updated," 3-D image to output to the PDA 110 to be displayed on image display device 115.

Both pose determination device 120 and the 3-D rendering device 125 may be controlled by processor 145. In other embodiments, separate processors may control the pose determination device 120 and the 3-D rendering device 125. The processor 145 may be coupled to a memory 150, which may be utilized to store code to be executed to carry out the functions of the image processing device 105. The memory 150 may be a Random Access Memory (RAM) such as a Dynamic RAM (DRAM), for example.

Figure 2A:
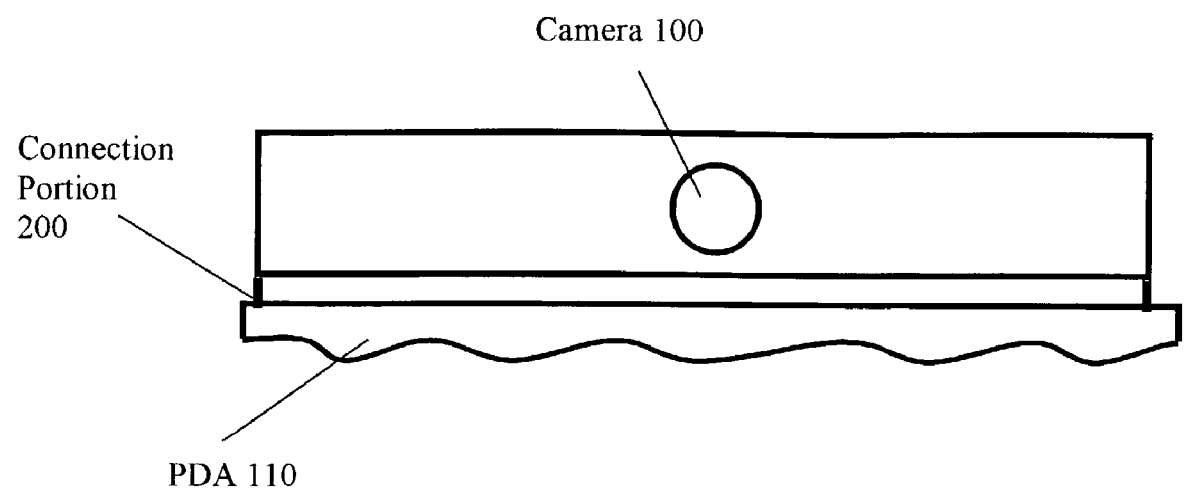
FIG. 2A illustrates a camera coupled to a PDA by a connector portion according to an embodiment of the invention.

FIG. 2A illustrates a camera 100 coupled to a PDA 110 by a connector portion 200 according to an embodiment of the invention. As shown, connector portions 200 may be utilized to couple the camera 100 to the PDA 110. The connector portion 200 may be formed of the same type of material as the outer surfaces of the camera 100 and the PDA 110, such as a plastic, for example.

Figure 2B:
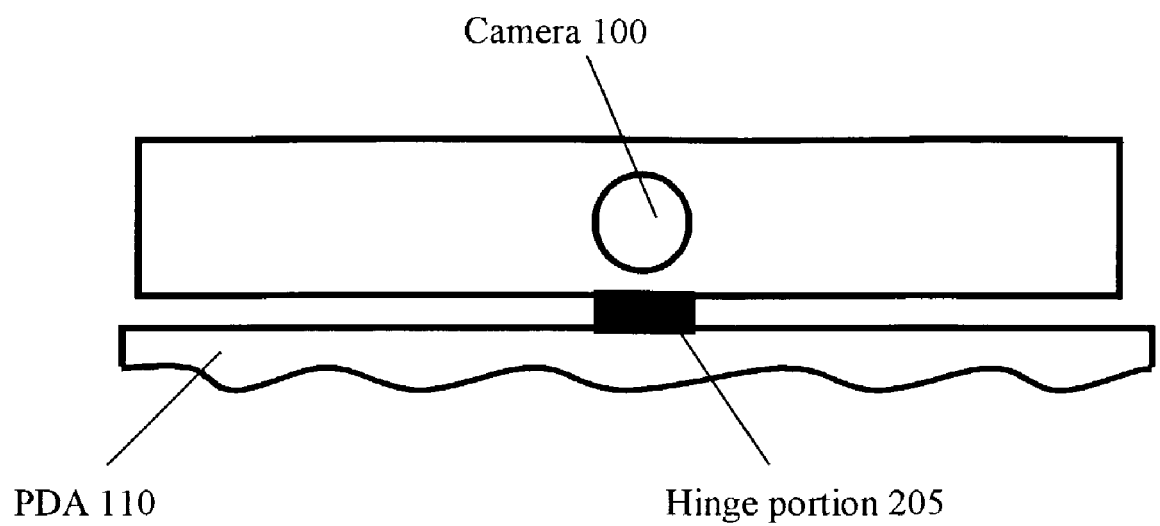
FIG. 2B illustrates a camera coupled to a PDA by a hinge portion according to an embodiment of the invention.

FIG. 2B illustrates a camera 100 coupled to a PDA 110 by a hinge portion 205 according to an embodiment of the invention. As illustrated, the hinge portion 205 may be utilized to coupled the camera 100 to the PDA 110. The camera 100 may swivel about the hinge portion 205 so that the camera 100 may face away from the image display device 115. Accordingly, in an alternative embodiment of the invention, the landmarks may be located on the floor, for example. Pursuant to such an embodiment, as the user walks around holding the PDA 110, the 3-D virtual environment display on the image display device 115 may change as the user moves. The hinge portion 205 may be formed of a metal, a hard plastic, or any other suitable sturdy material.

Figure 2C:
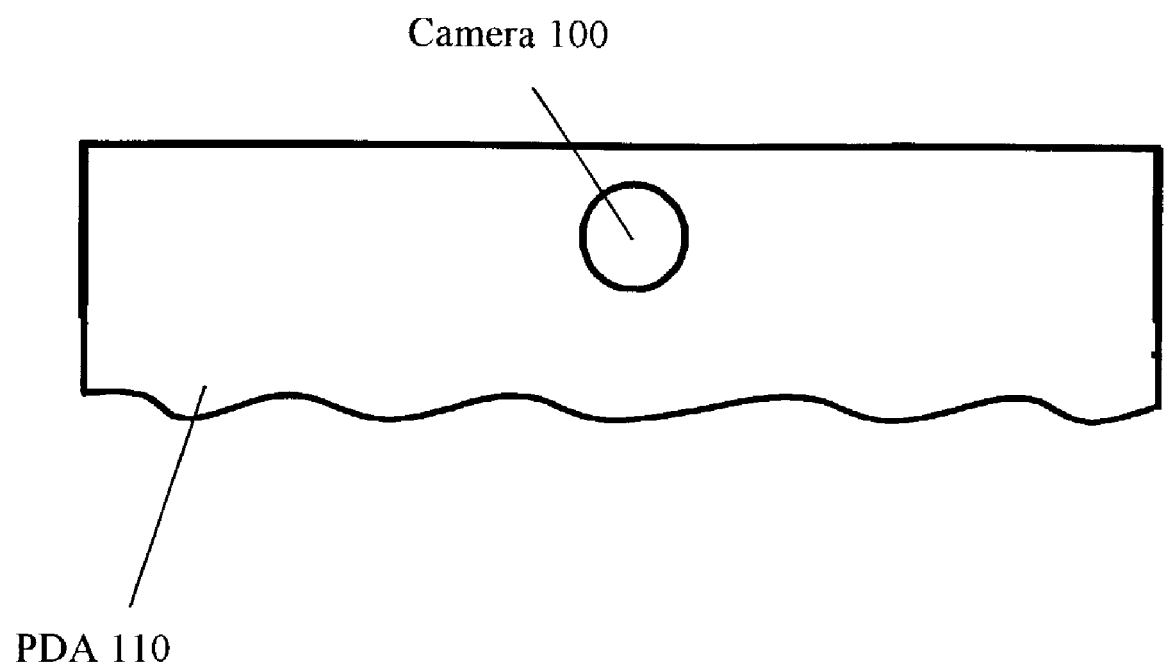
FIG. 2C illustrates a camera housed within a PDA according to embodiment of the invention.

FIG. 2C illustrates a camera 100 housed within a PDA 110 according to embodiment of the invention. As illustrated, the camera 100 is physically housed within the PDA 110, and is located at the top of the PDA 110.

Figure 3:
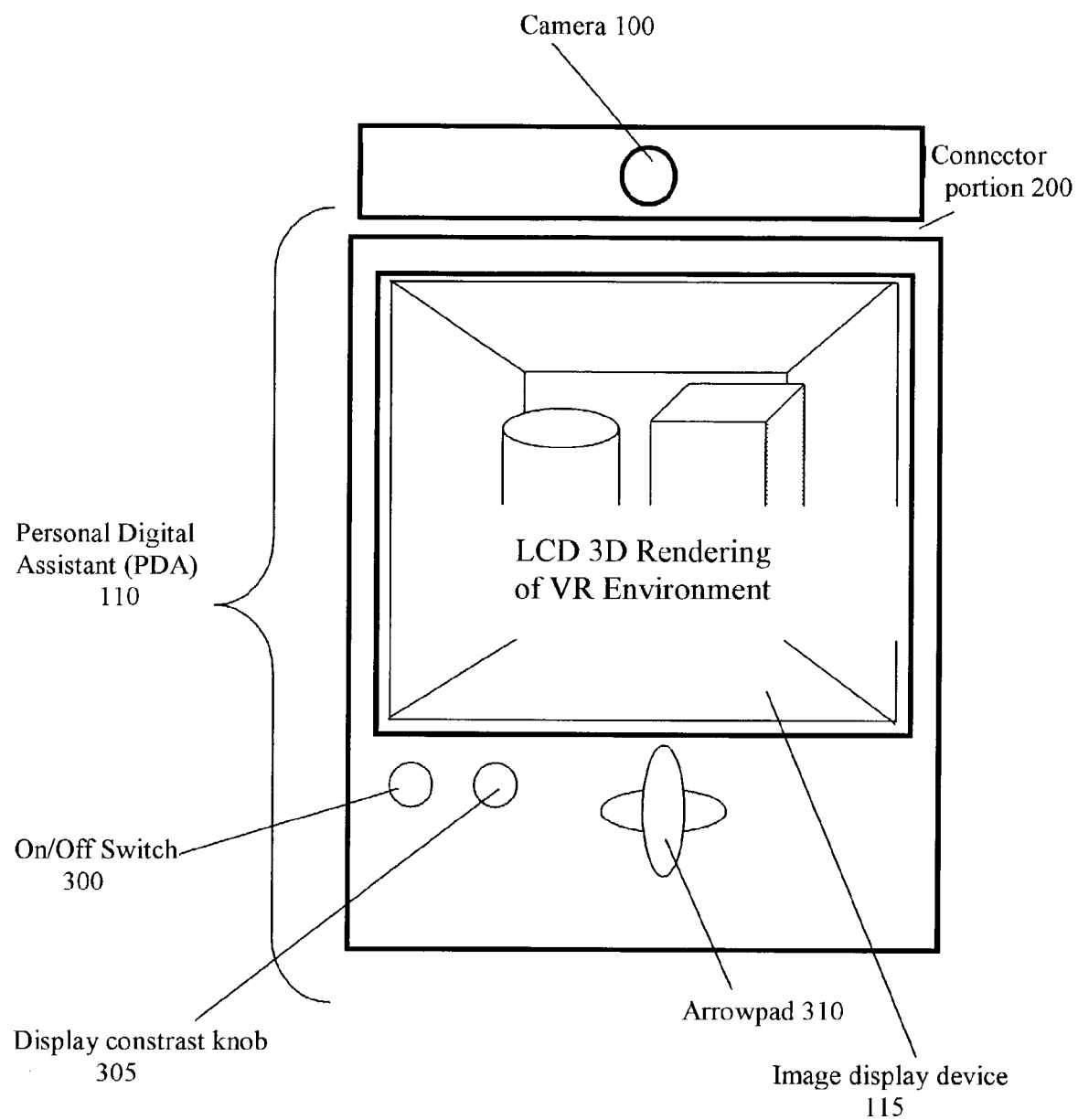
FIG. 3 illustrates a up-close view of a PDA according to an embodiment of the invention.

FIG. 3 illustrates a up-close view of a PDA 110 according to an embodiment of the invention. As shown, the image display device 115 may illustrate an image of a 3-D virtual environment. The PDA 110 may also include an "On/Off" switch 300 to turn on or off the PDA 110. The PDA 110 may use batteries as a source of power, for example. The PDA 110 may also include a display contrast knob 305 to adjust the contrast of the image display device 115, for example. The PDA 110 may also utilize an arrow pad 310 to alter the position of the camera 100, which is utilized to change the 3-D virtual environment viewable on the image display device 115.

Figure 4:
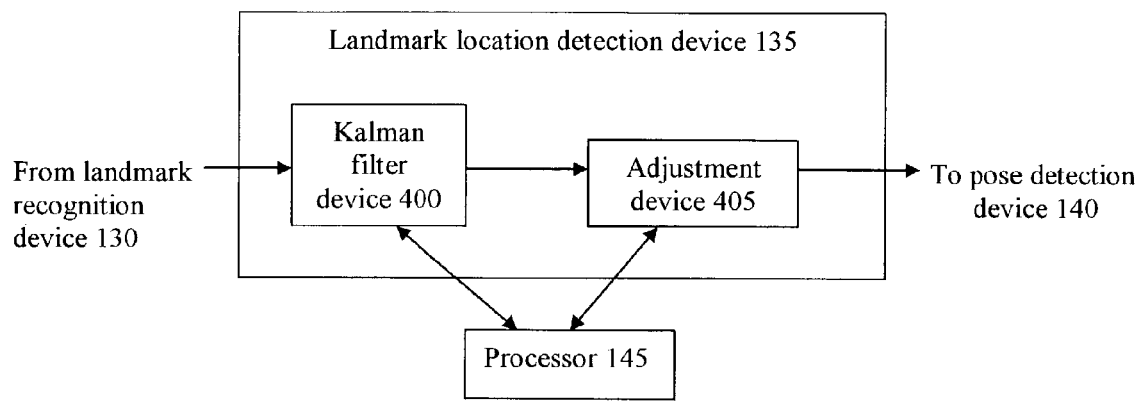
FIG. 4 illustrates a close-up view of a landmark location detection device according to an embodiment of the invention.

FIG. 4 illustrates a close-up view of a landmark location detection device 135 according to an embodiment of the invention. The landmark location detection device 135 may include a Kalman filter device 400. The Kalman filter device 400 may implement a set of mathematical equations (e.g., a Kalman filter) to provide an efficient recursive computational solution according to the least-squares method. The Kalman filter 400 may support estimations of past, present, and future states for the landmark positions that are estimates by the landmark location detection device 135. The adjustment device 405 may further adjust data filtered through the Kalman filter 400. The adjustment device 405 may employ additional filtering or signal processing methods to more precisely estimate the location of landmarks. Also, if the user very quickly moves the PDA 110, the estimations of the landmark location detection device 135 may be too unreliable to use to determine the pose of the user. Accordingly, if the actual determined location of a landmark in an image is too far away from the estimated location of the landmark in the previous image, the adjustment device 405 may determine that the estimated data will be too unreliable to determine the user's pose, and may instead cause the pose data from the previous image to continue to be utilized until the rate of movement of the user slows to an acceptable level. The speed of the user at which the estimated landmark position data may become unreliable may be system-dependent. Specifically, the more processing power the processor 145 has, the faster the movements of the user that may utilized to estimate reliable position estimates of landmarks.

The 3-D virtual reality displayed on the image display device 115 of the PDA 110 may be utilized, for example, as part of a medical teaching tool. For example, different diseased skin conditions may be displayed on the image display device 115. In such an embodiment, instead of utilized landmarks comprised of colored dots or markers, the landmarks may simply be the user's eyes. Accordingly, the user may be a medical student who may look at the PDA 110, and based upon the pose of the user, an image may be displayed on the PDA 110 showing a virtual face of a person with the diseased skin condition. Accordingly, the displayed face may move as though the user were looking directly at a mirror. The user may move his/her face and look at the diseased skin of the displayed image. For teaching purposes, the user may be able to peel away sections of skin on the face of the displayed image and look at muscle located underneath, for example. Because the displayed face may move as the user moves his/her face, the user may see what the muscles on the virtual face look like, for example.

Figure 5A:
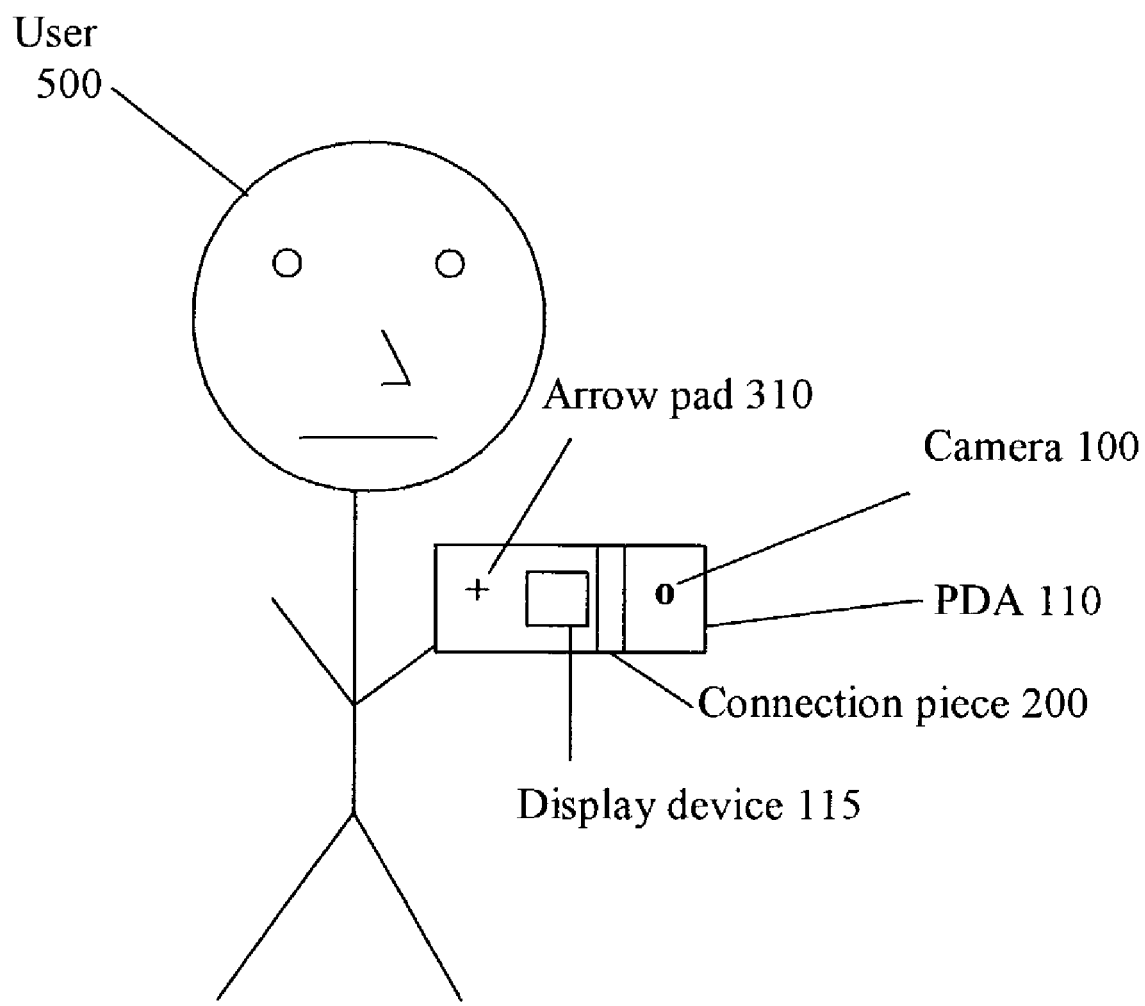
FIG. 5A illustrates a user holding a PDA according to an embodiment of the invention.

FIG. 5A illustrates a user 500 holding the PDA 110 according to an embodiment of the invention. As shown, the user 500 may hold the PDA 110 in one hand and look directly at the image display device 115. The camera 100 may capture images of the user looking at the image display device 115 and may locate the user's 500 eyes in the image. The position of the user's 500 eyes may be utilized to determine the user's 500 pose. Rather than display the user's 500 face on the image display device 115, the face of a celebrity may instead be displayed, for example. In an embodiment, the face of the movie star may be displayed. Therefore, if the user 500 looks at the PDA 110, the face of the user's 500 favorite action star may be displayed as looking back at the user 500 on the image display device 115.

Since only one camera 100 is shown being utilized, the image processing device 105 may only be able to measure movements of the user 110 in the x-y plane. For example, the user 500 may look straight at the PDA 110 and tilt the user's head to the right or left.

Figure 5B:
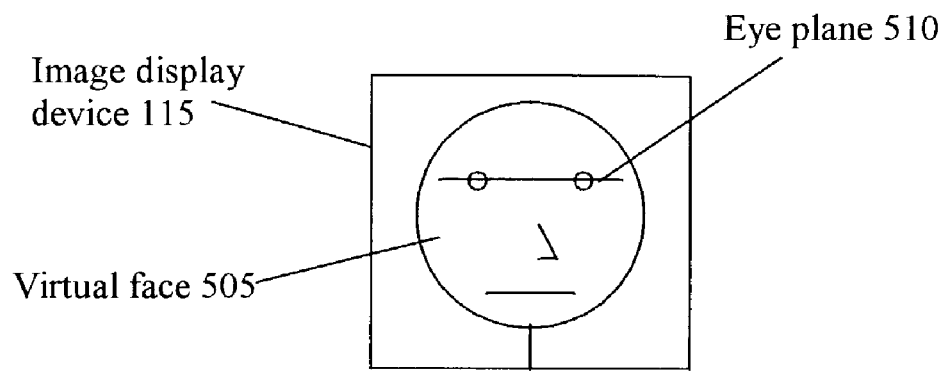
FIG. 5B illustrates an image of a virtual face looking straight ahead that is displayed on an image display device of a PDA according to an embodiment of the invention.

FIG. 5B illustrates an image of a virtual face 505 looking straight ahead that is displayed on the image display device 115 of the PDA 110 according to an embodiment of the invention. As shown, the user 500 may look straight at the PDA 110 and the image displayed on the image display device 115 may look at the user 500. A "virtual face" 505 is displayed. As illustrated, an eye plane 510 may be formed by a virtual line drawn between the eyes. When the image of the user 500 is captured by the camera 100, the image may be processed and the angle of the eye plane of the pixels representing the user's eyes may be utilized to determine the direction that the user's head is tilted. Accordingly, the displayed virtual face 505 may tilt in a direction mirroring that of the user 500.

Figure 5C:
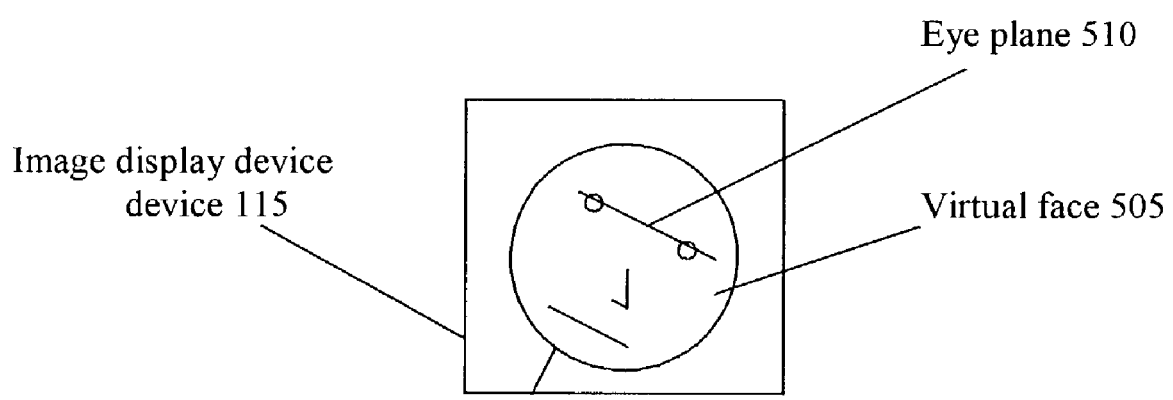
FIG. 5C illustrates an image of a virtual face tilted to the right that is displayed on an image display device of a PDA according to an embodiment of the invention.

FIG. 5C illustrates an image of a virtual face 505 tilted to the right that is displayed on the image display device 115 of the PDA 110 according to an embodiment of the invention. As shown, the eye plane 510 of the virtual face tilts down to the right. This virtual face may be reproduced if the user looks at the PDA 110 and tilts the user's 500 head down to the right.

Figure 6A:
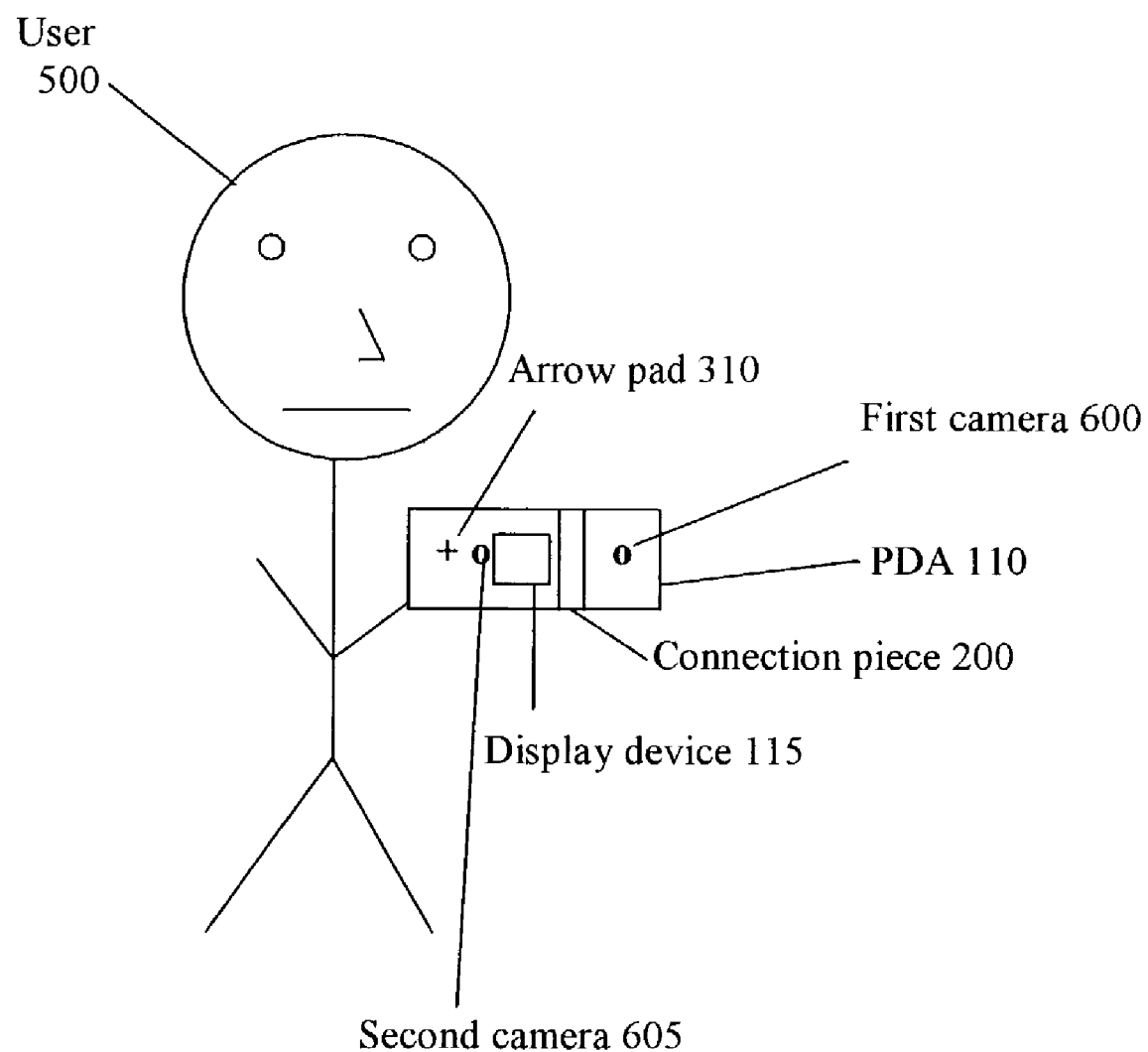
FIG. 6A illustrates a user holding a PDA having a first camera and a second camera according to an embodiment of the invention.

However, the image processing device 120 may have trouble dealing with a situation where the user actually turns the user's 500 head to the right, left, up, or down, rather than simply tilting to the left or right. Accordingly, to help measure movements in the "z" direction (e.g., depth), a second camera may be utilized. FIG. 6A illustrates a user 500 holding the PDA 110 having a first camera 600 and a second camera 605 according to an embodiment of the invention. The first camera 600 may be situated at the top of the PDA 110, or coupled to the top of the PDA 110. The second camera 605 may be situated just below the image display device 115. In other embodiments, the first 600 and second 605 cameras be located at the top corners of the PDA 110, or in other suitable locations. In other embodiments, 3-dimensions may be determined via a single camera. For example, image processing device 120 may determine whether the user rotated his/her head based on a difference in the size of a pupil in the of the user's eyes relative to the size of the pupil in the other eye. Also, the image processing device 120 may determine such movement by analyzing where specific points (e.g., pupils, chin, nose, etc.) on the user's face move from frame-to-frame.

Figure 6B:
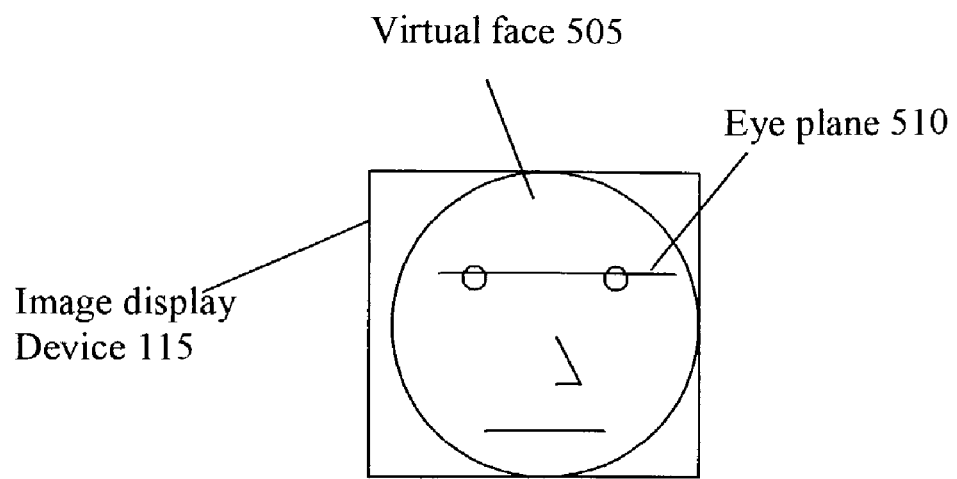
FIG. 6B illustrates an image of a virtual face looking straight ahead that is displayed on an image display device of a PDA according to an embodiment of the invention.

FIG. 6B illustrates an image of a virtual face 505 looking straight ahead that is displayed on the image display device 115 of the PDA 110 according to an embodiment of the invention. Since two cameras 600 and 605 are utilized, the image processing device 105 may be able to detect when the user turns the user's head to the right or left, for example. The image processing device 105 may also be able to detect when the user 500 moves closer to, or away from the PDA 110.

Figure 6C:
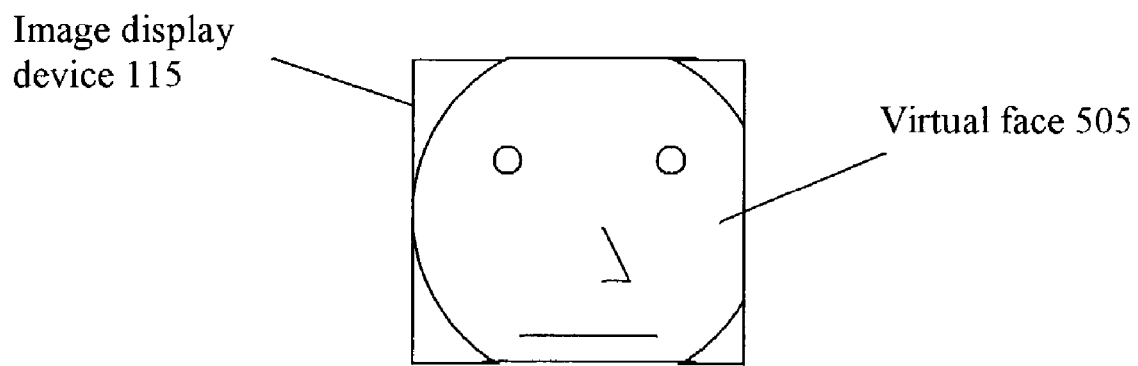
FIG. 6C illustrates a zoomed-in image of a virtual face looking straight ahead that is displayed on an image display device of the PDA according to an embodiment of the invention.

FIG. 6C illustrates a zoomed-in image of a virtual face 505 looking straight ahead that is displayed on the image display device 115 of the PDA 110 according to an embodiment of the invention. As shown, the virtual face 505 that is displayed is so large that it does not fit on the image display device 115. This virtual face 505 may be larger than the virtual face 505 displayed in FIG. 6B because the user may be closer to the cameras 600 and 605 than the user's face was when virtual face 505 of FIG. 6B was displayed.

Figure 7:
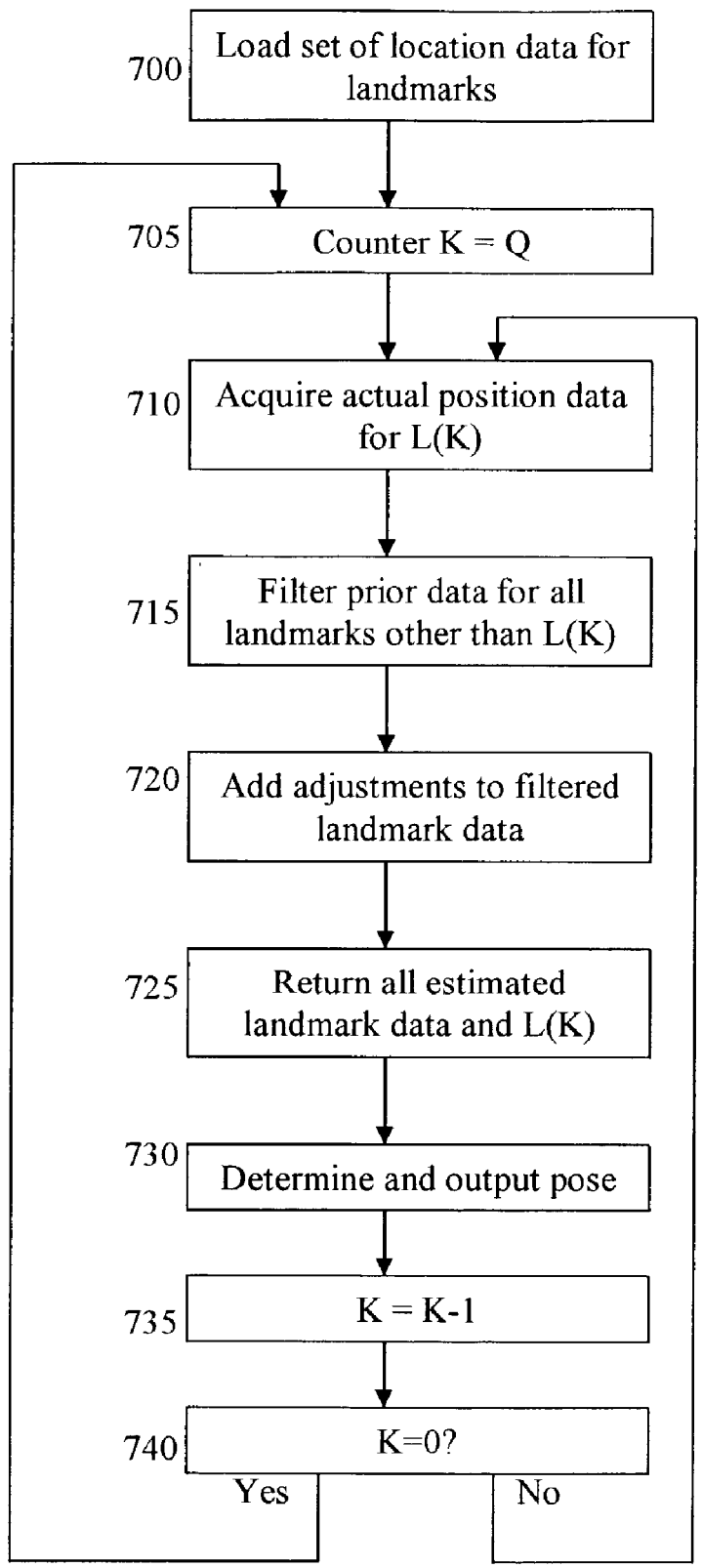
FIG. 7 illustrates a method utilized by a pose determination device to determine a pose according to an embodiment of the invention.

FIG. 7 illustrates a method utilized by the pose determination device 120 to determine a pose according to an embodiment of the invention. First, the set of location data for landmarks may be loaded 700. For example, each time an image is captured, position data concerning the locations of the landmarks in the prior image may be utilized to estimate the positions of the landmarks in the new image. Next, a counter K is initialized 705 to the value "Q." The actual position data for landmark L(K) may then be determined 710. L(K) may be a landmark located in the image. The landmarks may be included in the set of {L(Q), L(Q−1), . . . , L(1)}. Next, the previous position data for all landmarks other L(K) may be filtered 715 to determine position estimates. Adjustments may then be made 720 to the position data to determine more precise positional data. All estimated landmark data and L(K) may then be given 725 to the pose calculating device 140, which may be utilized to determine and output 730 the relevant pose of the camera 100. Next, the counter K may be decremented 735. If K is determined to be "0", processing continues at operation 705. Otherwise, processing continues at operation 710.

The 3-D virtual environment may be utilized for medical purposes, for example. The user may look at the PDA 110 and view a virtual head of a virtual person suffering from a disease such as psoriasis, for example. As the user 500 looks at the PDA 110 and moves the user's 500 head, the displayed virtual head may illustrate what a patient's head would look like that had psoriasis. Also, the user 500 may be able to program the PDA 110 to initially display a virtual face, and then may peel away the skin and shown a virtual brain, or other bodily organ, for example. The user 500 may shift the user's 500 head around and view what the virtual brain looks like for educational purposes, for example.

Another useful embodiment involves directing the camera 100 toward a damaged car. The user 500 may then view a virtual representation of what the undamaged car would look like, and may use such information to determine an estimate of the cost of repairing the car, for example.

Another embodiment involves multiple users each utilizing a PDA 110 as part of a multi-player game, for example. Each of the PDAs 110 may be networked wirelessly, for example, for the game. The users 500 may then compete against each other or may compete on the same team of a game.

While the description above refers to particular embodiments of the present invention, it will be understood that many modifications may be made without departing from the spirit thereof. The accompanying claims are intended to cover such modifications as would fall within the true scope and spirit of an embodiment of the present invention. The presently disclosed embodiments are therefore to be considered in all respects as illustrative and not restrictive, the scope of an embodiment of the invention being indicated by the appended claims, rather than the foregoing description, and all changes which come within the meaning and range of equivalency of the claims are therefore intended to be embraced therein.

What is claimed is:

1. A system to capture an image and determine a position of an object, comprising:
    a hand-held personal digital assistant (PDA);
    a camera communicatively coupled to the hand-held PDA to capture an image while the PDA is hand-held;
    a first processing module to recognize a set of predetermined landmarks, including a first landmark and remainder landmarks, in the image;
    a second processing module to determine an actual location of the first landmark in the image, the actual location of the first landmark representing a single constraint, and apply at least one filtering scheme to estimate positions of the remainder landmarks in the image based on the actual location of the first landmark representing the single constraint;
    a third processing module to determine a pose of the object based on the actual location of the first landmark representing the single constraint and the estimated positions of the remainder landmarks; and
    a rendering module to calculate a three-dimensional (3-D) representation of the image using the pose of the object based on the actual location of the first landmark representing the single constraint and the estimated positions of the remainder landmarks.

2. The system of claim 1, wherein the first, second, and third processing modules are all housed within an image processing device.

3. The system of claim 1, wherein the at least one filtering scheme includes application of a Kalman filter.

4. The system of claim 1, wherein the object is a user's face.

5. The system of claim 1, wherein the object is the camera.

6. The system of claim 1, wherein the set of predetermined landmarks includes colored landmarks having a predetermined color.

7. The system of claim 1, wherein the set of predetermined landmarks includes shaped landmarks having a predetermined shape.

8. The system of claim 1, further including a display device to display the calculated 3-D representation of the image.

9. An apparatus to determine a position of an object, comprising:
    a Hand-held personal digital assistant (PDA);
    a reception device communicatively coupled to the hand-held PDA to receive an image while the PDA is hand-held;
    a first processing module to recognize a set of predetermined landmarks, including a first landmark and remainder landmarks, in the image;
    a second processing module to determine an actual location of the first landmark in the image, the actual location of the first landmark representing a single constraint, and apply at least one filtering scheme to estimate positions of the remainder landmarks in the image based on the actual location of the first landmark representing the single constraint;
    a third processing module to determine a pose of the object based on the actual location of the first landmark representing the single constraint and the estimated positions of the remainder landmarks, and
    a rendering module to calculate a three-dimensional (3-D) representation of the image using the pose of the object based on the actual location of the first landmark representing the single constraint and the estimated positions of the remainder landmarks.

10. The apparatus of claim 9, wherein the first, second, and third processing modules are all housed within an image processing device.

11. The apparatus of claim 9, wherein the at least one filtering scheme includes application of a Kalman filter.

12. The apparatus of claim 9, wherein the object is a user's face.

13. The apparatus of claim 9, wherein the object is the Hand-held personal digital assistant (PDA).

14. The apparatus of claim 9, wherein the set of predetermined landmarks includes colored landmarks having a predetermined color.

15. The apparatus of claim 9, wherein the set of predetermined landmarks includes shaped landmarks having a predetermined shape.

16. The apparatus of claim 9, further including a display device to display the calculated 3-D representation of the image.

17. A method to determine a position of an object, comprising:
    capturing an image using a reception device communicatively coupled to a Hand-held personal digital assistant (PDA) while the PDA is hand-held;
    recognizing a set of predetermined landmarks, including a first landmark and remainder landmarks, in the image;
    determining an actual location of the first landmark in the image, the actual location of the first landmark representing a single constraint;
    applying at least one filtering scheme to estimate positions of the remainder landmarks in the image based on the actual location of the first landmark representing the single constraint;
    determining a pose of the object based on the actual location of the first landmark representing the single constraint and the estimated positions of the remainder landmarks, and
    calculating a three-dimensional (3-D) representation of the image using the pose of the object based on the actual location of the first landmark representing the single constraint and the estimated positions of the remainder landmarks.

18. The method according to claim 17, wherein the at least one filtering scheme includes application of a Kalman filter.

19. The method according to claim 17, wherein the object is a user's face.

20. The method according to claim 17, wherein the object is a camera.

21. The method according to claim 17, wherein the set of predetermined landmarks includes colored landmarks having a predetermined color.

22. The method according to claim 17, wherein the set of predetermined landmarks includes shaped landmarks having a predetermined shape.

23. The method according to claim 17, further including displaying the calculated 3-D representation of the image.

24. The method according to claim 17, further including: capturing a subsequent image; determining an actual location of a second landmark; and estimating positions of the first landmark and the remainder landmarks other than the second landmark.

25. An article comprising:
    a storage medium having stored thereon instructions that when executed by a machine result in the following:

capturing an image using a reception device communicatively coupled to a Hand-held personal digital assistant (PDA), while the PDA is hand-held;

recognizing a set of predetermined landmarks, including a first landmark and remainder landmarks, in the image;

determining an actual location of the first landmark in the image, the actual location of the first landmark representing a single constraint;

applying at least one filtering scheme to estimate positions of the remainder landmarks in the image based on the actual location of the first landmark representing the single constraint;

determining a pose of an object based on the actual location of the first landmark representing the single constraint and the estimated positions of the remainder landmarks, and calculating a three-dimensional (3-D) representation of the image using the pose of the object based on the actual location of the first landmark representing the single constraint and the estimated positions of the remainder landmarks.

26. The article according to claim 25, wherein the at least one filtering scheme includes application of a Kalman filter.

27. The article according to claim 25, wherein the object is a user's face.

28. The article according to claim 25, wherein the object is the Hand-held personal digital assistant (PDA).

29. The article according to claim 25, wherein the set of predetermined landmarks includes colored landmarks having a predetermined color.

30. The article according to claim 25, wherein the set of predetermined landmarks includes shaped landmarks having a predetermined shape.

31. The article according to claim 25, wherein the instructions further result in displaying the calculated 3-D representation of the image.

32. The article according to claim 25, wherein the instructions further result in: capturing a subsequent image; determining an actual location of a second landmark; and estimating positions of the first landmark and the remainder landmarks other than the second landmark.

* * * * *